(12) United States Patent
Tamura et al.

(10) Patent No.: US 11,057,807 B2
(45) Date of Patent: Jul. 6, 2021

(54) FIRST BASE STATION, SECOND BASE STATION, AND METHOD

(71) Applicant: NEC CORPORATION, Tokyo (JP)

(72) Inventors: Tomu Tamura, Tokyo (JP); Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 68 days.

(21) Appl. No.: 16/279,010

(22) Filed: Feb. 19, 2019

(65) Prior Publication Data
US 2019/0289515 A1 Sep. 19, 2019

(30) Foreign Application Priority Data

Mar. 15, 2018 (JP) .............................. JP2018-047690

(51) Int. Cl.
| | |
|---|---|
| *H04W 36/08* | (2009.01) |
| *H04W 36/00* | (2009.01) |
| *H04W 88/08* | (2009.01) |

(52) U.S. Cl.
CPC ....... *H04W 36/08* (2013.01); *H04W 36/0069* (2018.08); *H04W 88/08* (2013.01)

(58) Field of Classification Search
CPC .. H04W 36/08; H04W 36/0069; H04W 88/08
See application file for complete search history.

(56) References Cited

U.S. PATENT DOCUMENTS

| | | | | |
|---|---|---|---|---|
| 2006/0003771 | A1* | 1/2006 | Heino | H04W 36/22 455/446 |
| 2007/0070949 | A1* | 3/2007 | Hwang | H04W 8/20 370/331 |
| 2009/0170516 | A1* | 7/2009 | Ostrup | H04W 48/10 455/436 |

(Continued)

FOREIGN PATENT DOCUMENTS

| | | |
|---|---|---|
| JP | 2017-501624 A | 1/2017 |
| WO | 2015/136888 A1 | 9/2015 |

OTHER PUBLICATIONS

3GPP TS 37.340 V2.0.0, "3rd Generation Partnership Project; Technical Specification Group Radio Access Network; Evolved Universal Terrestrial Radio Access (E-UTRA) and NR; Multi-connectivity; Stage 2 (Release 15)", Dec. 2017, pp. 1-51.

(Continued)

*Primary Examiner* — Luat Phung
(74) *Attorney, Agent, or Firm* — Sughrue Mion, PLLC

(57) ABSTRACT

In order to make it possible to appropriately select a secondary base station in a case of establishing dual connectivity after a handover, a base station 100 includes: a memory storing instructions; and one or more processors configured to execute the instructions to: communicate with a terminal apparatus 300 in accordance with a first radio access technology; obtain handover result information related to results of handovers from the base station 100 to other base stations 10, 20, 30, and 40; and transmit, when the terminal apparatus 300 performs a handover from the base (Continued)

station 100 to a base station 200 communicating in accordance with a second radio access technology, the handover result information to the base station 200.

7 Claims, 14 Drawing Sheets

(56) References Cited

U.S. PATENT DOCUMENTS

| | | | | |
|---|---|---|---|---|
| 2012/0064896 | A1* | 3/2012 | Guo | H04W 36/0066 |
| | | | | 455/436 |
| 2013/0012212 | A1* | 1/2013 | Murakami | H04W 36/245 |
| | | | | 455/439 |
| 2014/0241316 | A1* | 8/2014 | Okmyanskiy | H04W 36/0083 |
| | | | | 370/331 |
| 2015/0094069 | A1* | 4/2015 | Gopal | H04W 36/08 |
| | | | | 455/437 |
| 2015/0289181 | A1* | 10/2015 | Bromell | H04W 36/0088 |
| | | | | 455/436 |
| 2015/0319805 | A1* | 11/2015 | Tamura | H04W 24/02 |
| | | | | 455/517 |
| 2015/0327143 | A1* | 11/2015 | Won | H04W 24/10 |
| | | | | 370/332 |
| 2016/0037400 | A1* | 2/2016 | Kai | H04W 36/0061 |
| | | | | 370/331 |
| 2019/0261197 | A1* | 8/2019 | Bellamkonda | H04W 24/04 |
| 2019/0281645 | A1* | 9/2019 | Van Der Velde | H04L 5/00 |
| 2019/0357095 | A1* | 11/2019 | Pakniat | H04W 36/0083 |
| 2020/0029389 | A1* | 1/2020 | Yilmaz | H04W 76/18 |

OTHER PUBLICATIONS

3GPP TS 36.413 V14.4.0, "3rd Generation Partnership Project; Technical Specification Group Radio Access Network; Evolved Universal Terrestrial Radio Access Network (E-UTRAN); S1 Application Protocol (S1AP) (Release 14)", Sep. 2017, pp. 1-353.

3GPP TS 23.401 V15.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)", Sep. 2017, pp. 1-397.

3GPP TS 38.413 V0.5.0, "3rd Generation Partnership Project; Technical Specification Group Radio Access Network; NG Radio Access Network (NG-RAN); NG Application Protocol (NGAP) (Release 15)", Dec. 2017, pp. 1-88.

* cited by examiner

| HO TARGET FROM CELL 100-1 | HO SUCCESS RATE |
| --- | --- |
| CELL200-1 | 99% |
| CELL10-1 | 70% |
| CELL20-1 | 99% |
| CELL30-1 | 99% |
| CELL40-1 | 99% |

Figure 6

11.3.63.2.x    RAN-INFORMATION Application Container for SN Addition

The coding of the *SN Addition Container* IE within the RAN-INFORMATION RIM container for the SN Addition is specified as follows:

Table 11.3.63.2.x: RAN-INFORMATION Application Container coding for SN Addition

| 8 | 7 | 6 | 5 | 4 | 3 | 2 | 1 | |
|---|---|---|---|---|---|---|---|---|
| IEI | | | | | | | | Octet 1 |
| Length Indicator | | | | | | | | Octet 2, 2a |
| Handover History Information | | | | | | | | Octet 3-n |

Figure 7

9.2.xx gNB DIRECT INFORMATION TRANSFER

This message is sent by the gNB in order to transfer specific information.
Direction: NG-RAN node → AMF.

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Inter-system Information Transfer Type | M | | 9.3.x.x | | YES | reject |

Figure 8

FIRST BASE STATION, SECOND BASE STATION, AND METHOD

BACKGROUND

Technical Field

The present invention relates to a first base station, a second base station, and a method.

Background Art

With a recent increase in data communication traffic, there is a tendency to adopt a network configuration called Heterogeneous Network (HetNet). In HetNet, in some cases, a plurality of small cells which use a radio access technology different from that of a macro cell intended for securing coverage, are deployed in the macro cell for the purpose of securing capacity.

Moreover, for improvement in throughput, a User Equipment (UE) establishes dual connectivity (DC) in some cases. In dual connectivity, carriers of a plurality of base stations are aggregated for communication.

There have been discussions on a procedure in which, after a handover (also referred to as an "HO" below) of a UE between fifth-generation (5G) or fourth-generation (4G) base stations in a mobile communication network, a handover-target base station executes SeNB/SgNB addition in consideration of capability of the UE and a state of the network (NW) to thereby establish dual connectivity. Concrete discussion results are described in "FIG. 10.9.1-1 eNB to Master Node change" and "FIG. 10.9.2-1 ng-eNB/gNB to MN change" in "10.9 eNB/gNB to Master Node Change" in 3GPP TS37.340 v2.0.0 (NPL 1). "FIG. 10.9.1-1 eNB to Master Node change" mentioned above is illustrated in FIG. 13, and "FIG. 10.9.2-1 ng-eNB/gNB to MN change" mentioned above is illustrated in FIG. 14.

Moreover, PTL 1 discloses a method of deleting a security context at the time of executing a handover within one radio access technology, for example.

[PTL 1] JP 2017-501624 T
[NPL 1] 3GPP TS37.340 v2.0.0, "10.9 eNB/gNB to Master Node Change", 2017-12
[NPL 2] 3GPP TS36.413 v14.4.0, 2017-09
[NPL 3] 3GPP TS23.401 v15.1.0, "5.15 RAN Information Management (RIM) procedures", 2017-09
[NPL 4] 3GPP TS38.413 v0.5.0, 2017-12

SUMMARY

Assume a system including a gNB connecting to a Next Generation Core Network (NGCN) and an eNB connecting to an Evolved Packet Core (EPC). In this system, in a case where a UE communicating with the gNB has succeeded in a handover to the eNB through an intersystem handover, the handover-target eNB may possibly establish dual connectivity. If an unsuitable SeNB/SgNB is selected in a case of establishing dual connectivity, dual connectivity release processing, SeNB/SgNB addition re-execution, and the like may occur frequently. This may consequently cause deterioration in users' quality of experience (QoE) and an increase in network processing load.

Although 3GPP has been advancing a discussion on 5G, there is no progress in discussion about a scenario of executing dual connectivity efficiently after an intersystem handover from a 5G network to a Long Term Evolution (LTE) network. Hence, 3GPP has not discussed any solution to the above-described problem.

An example object of the present invention is to provide a base station and a method that make it possible to appropriately select a secondary base station in a case of establishing dual connectivity after a handover.

A first base station according to the present invention includes: a memory storing instructions; and one or more processors configured to execute the instructions to: communicate with a terminal apparatus in accordance with a first radio access technology; obtain handover result information related to results of handovers from the first base station to other base stations; and transmit, when a terminal apparatus performs a handover from the first base station to a second base station communicating in accordance with a second radio access technology, the handover result information to the second base station.

A second base station according to the present invention includes: a memory storing instructions; and one or more processors configured to execute the instructions to: communicate with a terminal apparatus in accordance with a second radio access technology; obtain handover result information related to results of handovers from a first base station to other base stations, the first base station communicating in accordance with a first radio access technology; and perform, based on the handover result information, communication processing for a terminal apparatus performing a handover from the first base station to the second base station.

A method according to the present invention includes: obtaining handover result information related to results of handovers from a first base station to other base stations, the first base station communicating with a terminal apparatus in accordance with a first radio access technology; and transmitting, when a terminal apparatus performs a handover from the first base station to a second base station communicating in accordance with a second radio access technology, the handover result information to the second base station.

According to the present invention, it is possible to appropriately select a secondary base station in a case of establishing dual connectivity after a handover. Note that, according to the present invention, instead of or together with the above effect, other effects may be exerted.

BRIEF DESCRIPTION OF THE DRAWINGS

FIG. 6 illustrates a concrete example of handover result information.

FIG. 7 is an explanatory diagram of an SN Addition Container IE set in a RAN-INFORMATION RIM container.

FIG. 8 illustrates an example of DIRECT INFORMATION TRANSFER.

DESCRIPTION OF THE EXAMPLE EMBODIMENTS

Figure 1:
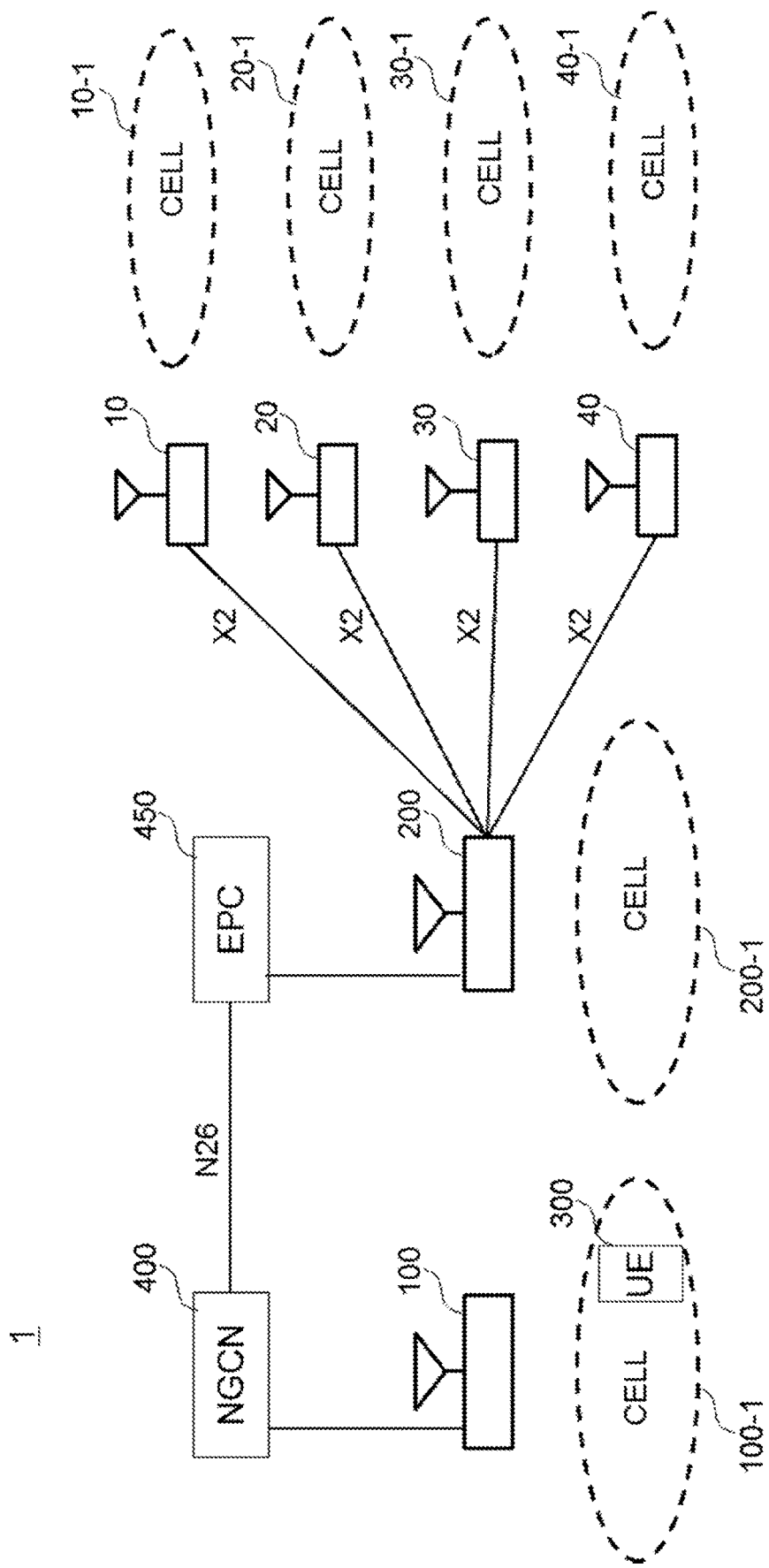
FIG. 1 is an explanatory diagram illustrating an example of a schematic configuration of a system according to a first example embodiment.

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be given in the following order.
1. Overview of Example Embodiments of the Present Invention
2. First Example Embodiment
2.1. Configuration of System
2.2. Configuration of Base Station 100
2.3. Configuration of Base Station 200
2.4. Configuration of Terminal Apparatus 300
2.5. Technical Features
2.6. Example Alterations
3. Second Example Embodiment
3.1. Configuration of System
3.2. Configuration of Base Station 500
3.3. Configuration of Base Station 600
3.4. Technical Features
4. Other Example Embodiments 1. Overview of Example Embodiments of the Present Invention First, an overview of example embodiments of the present invention will be described.

(1) Technical Problems

Assume a system including a gNB connecting to a Next Generation Core Network (NGCN) and an eNB connecting to an Evolved Packet Core (EPC). In this system, in a case where a UE communicating with the gNB has succeeded in a handover to the eNB through an intersystem handover, the handover-target eNB may possibly establish dual connectivity. If an unsuitable SeNB/SgNB is selected in a case of establishing dual connectivity, dual connectivity release processing and SeNB/SgNB addition re-execution may occur frequently. This may consequently cause deterioration in users' QoE and an increase in network processing load.

For example, assume that the UE communicating with the gNB performs a handover (intersystem handover) to the eNB. In this case, there has been no mechanism/technique for the handover-target eNB to determine, at the time of adding an SeNB (cell) in dual connectivity, a suitable SeNB (cell) so as to suppress dual connectivity release processing, SeNB/SgNB Addition re-execution, and the like.

Although 3GPP has been advancing discussion on fifth generation (5G), there is no progress in discussion about a scenario of executing dual connectivity efficiently after an intersystem handover from a 5G network to an LTE network. Hence, 3GPP has not discussed any solution to the above-described problem.

(2) Technical Features

In example embodiments of the present invention, for example, a first base station communicates with a terminal apparatus in accordance with a first radio access technology, obtains handover result information related to results of handovers from the first base station to other base stations, and transmits, when a terminal apparatus performs a handover from the first base station to a second base station communicating in accordance with a second radio access technology, the handover result information to the second base station.

Moreover, in example embodiments of the present invention, the second base station, for example, obtains the handover result information and performs, based on the handover result information, communication processing for the terminal apparatus performing a handover from the first base station to the second base station.

This, for example, makes it possible to appropriately select a secondary base station in a case of establishing dual connectivity after a handover.

Note that the above-described technical features are concrete examples of the example embodiments of the present invention, and, of course, the example embodiments of the present invention are not limited to the above-described technical features.

2. First Example Embodiment

Next, a description will be given of a first example embodiment of the present invention with reference to FIG. 1 to FIG. 10.

<2.1. Configuration of System>

With reference to FIG. 1, an example of a configuration of a system 1 according to the first example embodiment will be described. FIG. 1 is an explanatory diagram illustrating an example of a schematic configuration of the system 1 according to the first example embodiment. The system 1 includes, for example, a base station 100, a base station 200, base stations 10 to 40, and a terminal apparatus 300. In the present example embodiment, the description will be given by assuming that the base station 100 is a gNB, which is an example of 5G RAN nodes, the base station 200 is a Master Node B (MeNB), and each of the base stations 10 to 40 is a Secondary eNB (SeNB). However, the base station 100, the base station 200, and the base stations 10 to 40 are not limited to these. Examples other than these will also be described later.

The system 1 further includes an NGCN 400 and an EPC 450, for example. The base station 100 connects to the NGCN 400. The base station 100 configures a cell 100-1. The base station 200 connects to the EPC 450. The base station 200 configures a cell 200-1. The base station 200 is connected to each of the base stations 10 to 40 through an X2 interface. The base stations 10, 20, 30, and 40 configure a cell 10-1, a cell 20-1, a cell 30-1, and a cell 40-1, respectively. The NGCN 400 and the EPC 450 are connected to each other through an N26 interface.

As described above, the base stations configure respective cells. FIG. 1 schematically illustrates cells. In actuality, the base stations are located in respective cells, and the cells overlap one another.

Figure 2:
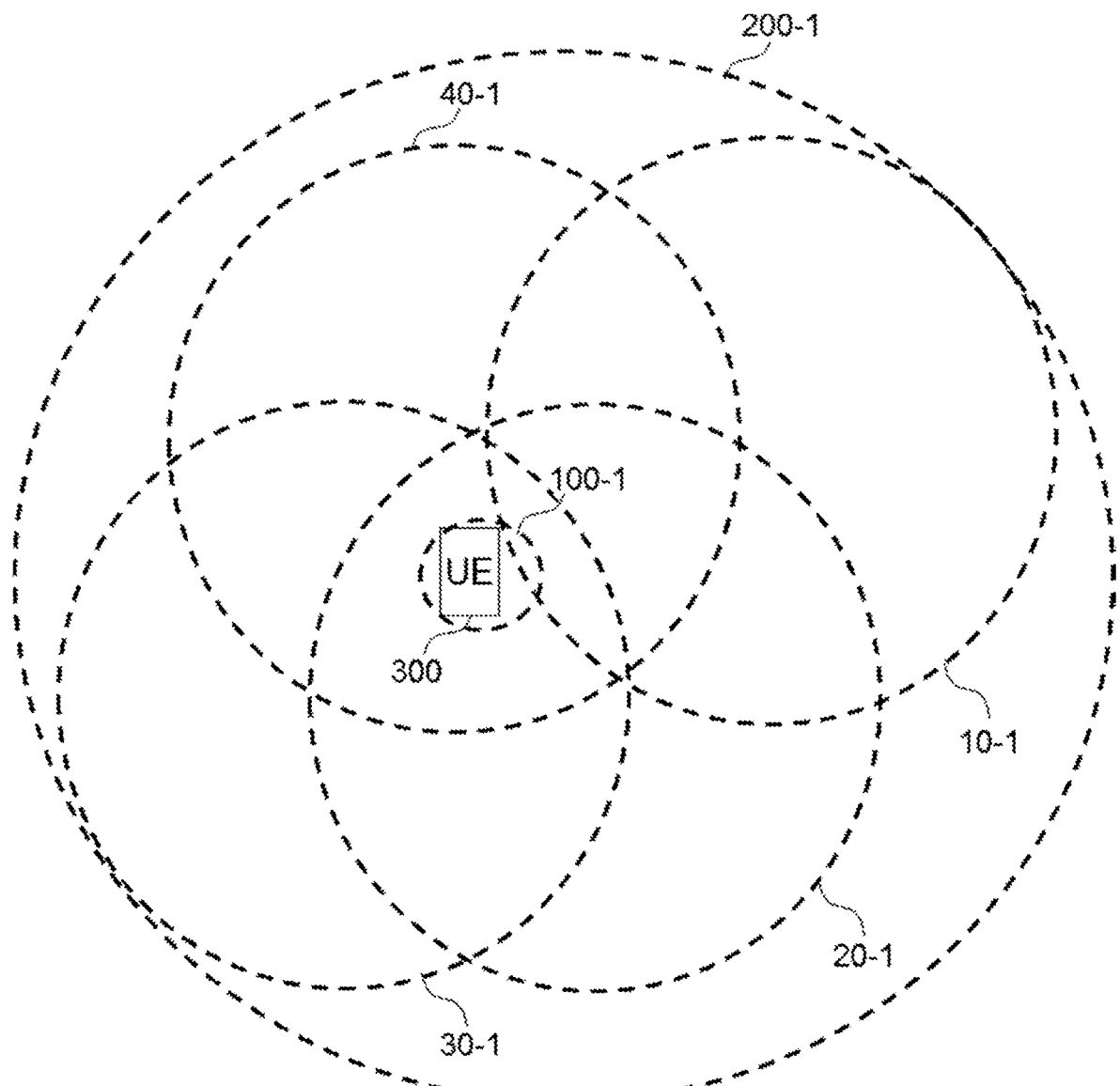
FIG. 2 illustrates an example of a cell arrangement.

FIG. 2 illustrates an example of a cell arrangement. In the present example embodiment, the arrangement of the cell 100-1, the cell 200-1, the cell 10-1, the cell 20-1, the cell 30-1, and the cell 40-1 is as illustrated in FIG. 2. However, the arrangement is not limited to this. The cell 200-1 is intended, for example, for securing coverage for terminal apparatuses (e.g., the terminal apparatus 300). The cell 100-1, the cell 10-1, the cell 20-1, the cell 30-1, and the cell 40-1 are intended, for example, for securing capacity for terminal apparatuses (e.g., the terminal apparatus 300). Hence, such a hierarchical cell configuration is adopted.

The NGCN 400 is referred to as a 5G Core Network (a 5GC, below) in 3GPP. The 5GC includes an Access Management Function (AMF), a Session Management Function (SMF), and a U-plane function node (UPF), for example.

The EPC 450 includes a Mobility Management Entity (MME), a Serving Gateway (S-GW), and a Packet Delivery Network Gateway (P-GW), for example.

In an example of the present example embodiment, all the base stations connecting to the EPC 450 are assumed to be eNBs for ease of description. However, some of or all the base stations may be gNBs.

(1) Base Station 100

The base station 100 is a gNB conforming to fifth-generation (5G)/New Radio (NR) standards or specifications (first radio access technology), for example. The base station 100 performs wireless communication with a terminal apparatus (e.g., the terminal apparatus 300) located in the cell 100-1.

The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node).

(2) Base Station 200

The base station 200 is an eNB conforming to LTE/LTE-Advanced and/or System Architecture Evolution (SAE) standards or specifications (second radio access technology), for example. Note that the second radio access technology is different (different in generation) from the first radio access technology.

Similarly to the base station 100, the base station 200 is a node configured to perform wireless communication with a terminal apparatus and performs wireless communication with a terminal apparatus (e.g., the terminal apparatus 300) located in the cell 200-1.

(3) Terminal Apparatus 300

The terminal apparatus 300 performs wireless communication with each of the base stations. For example, the terminal apparatus 300 performs wireless communication with the base station 100 in a case of being located in the cell 100-1. Moreover, the terminal apparatus 300 performs wireless communication with the base station 200 in a case of being located in the cell 200-1. The terminal apparatus 300 can perform wireless communication both with the gNB and the eNB.

For example, due to move of the terminal apparatus 300, a handover of the terminal apparatus 300 from the base station 100 to the base station 200 is performed. In this case, the base station 100 is a source base station of the handover, and the base station 200 is a target base station of the handover.

<2.2. Configuration of Base Station 100>

Figure 3:
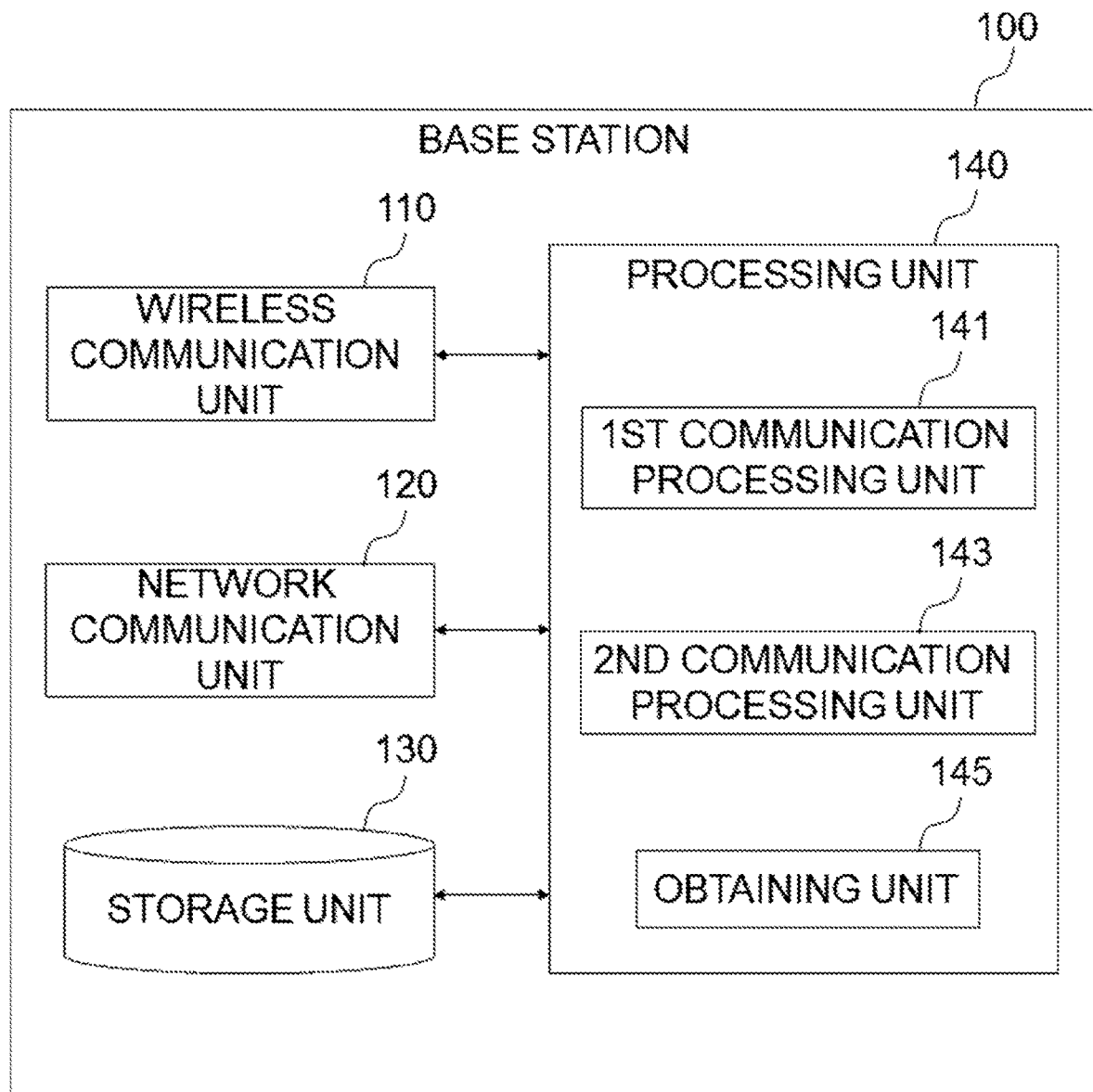
FIG. 3 is a block diagram illustrating an example of a schematic configuration of a base station according to the first example embodiment.

Next, with reference to FIG. 3, a description will be given of an example of a configuration of the base station 100 according to the first example embodiment. FIG. 3 is a block diagram illustrating an example of a schematic configuration of the base station 100 according to the first example embodiment. As illustrated in FIG. 3, the base station 100 includes a wireless communication unit 110, a network communication unit 120, a storage unit 130, and a processing unit 140.

(1) Wireless Communication Unit 110

The wireless communication unit 110 wirelessly transmits and/or receives a signal. For example, the wireless communication unit 110 receives a signal from a terminal apparatus and transmits a signal to the terminal apparatus.

(2) Network Communication Unit 120

The network communication unit 120 receives a signal from a backhaul and transmits a signal to the backhaul.

(3) Storage Unit 130

The storage unit 130 temporarily or permanently stores programs and parameters for operations of the base station 100 as well as various data. The programs include one or more instructions for operations of the base station 100.

(4) Processing Unit 140

The processing unit 140 provides various functions of the base station 100. The processing unit 140 includes a first communication processing unit 141, a second communication processing unit 143, and an obtaining unit 145. Note that the processing unit 140 may further include other constituent elements than these constituent elements. In other words, the processing unit 140 may also perform operations other than the operations of these constituent elements. Concrete operations of the first communication processing unit 141, the second communication processing unit 143, and the obtaining unit 145 will be described later in detail.

For example, the processing unit 140 (first communication processing unit 141) communicates with a terminal apparatus (e.g., the terminal apparatus 300) via the wireless communication unit 110. Moreover, the processing unit 140 (first communication processing unit 141) performs communication processing in accordance with fifth-generation (5G)/New Radio (NR) standards or specifications, for example. The processing unit 140 (second communication processing unit 143) communicates with another network node (e.g., the base station 200) via the network communication unit 120.

(5) Implementation Example

The wireless communication unit 110 may be implemented with an antenna, a radio frequency (RF) circuit, and the like, and the antenna may be a directional antenna. The network communication unit 120 may be implemented with a network adapter, a network interface card, or the like. The storage unit 130 may be implemented with a memory (e.g., a nonvolatile memory and/or a volatile memory), a hard disk, and/or the like. The processing unit 140 may be implemented with a baseband (BB) processor, a different processor and/or the like. The memory (storage unit 130) may be included in such a processor (chip) of the processing unit 140.

The base station 100 may include a memory configured to store a program (instructions) and one or more processors that can execute the program (instructions). The one or more processors may execute the program to perform operations of the processing unit 140 (operations of the first communication processing unit 141, the second communication processing unit 143, and the obtaining unit 145). The program may be a program for causing the processor(s) to perform operations of the processing unit 140 (operations of the first communication processing unit 141, the second communication processing unit 143, and the obtaining unit 145).

Note that the base station 100 may be virtualized. In other words, the base station 100 may be implemented as a virtual machine. In this case, the base station 100 (virtual machine) may operate as a physical machine (hardware) including a processor, a memory, and the like and a virtual machine on a hypervisor.

<2.3. Configuration of Base Station 200>

Figure 4:
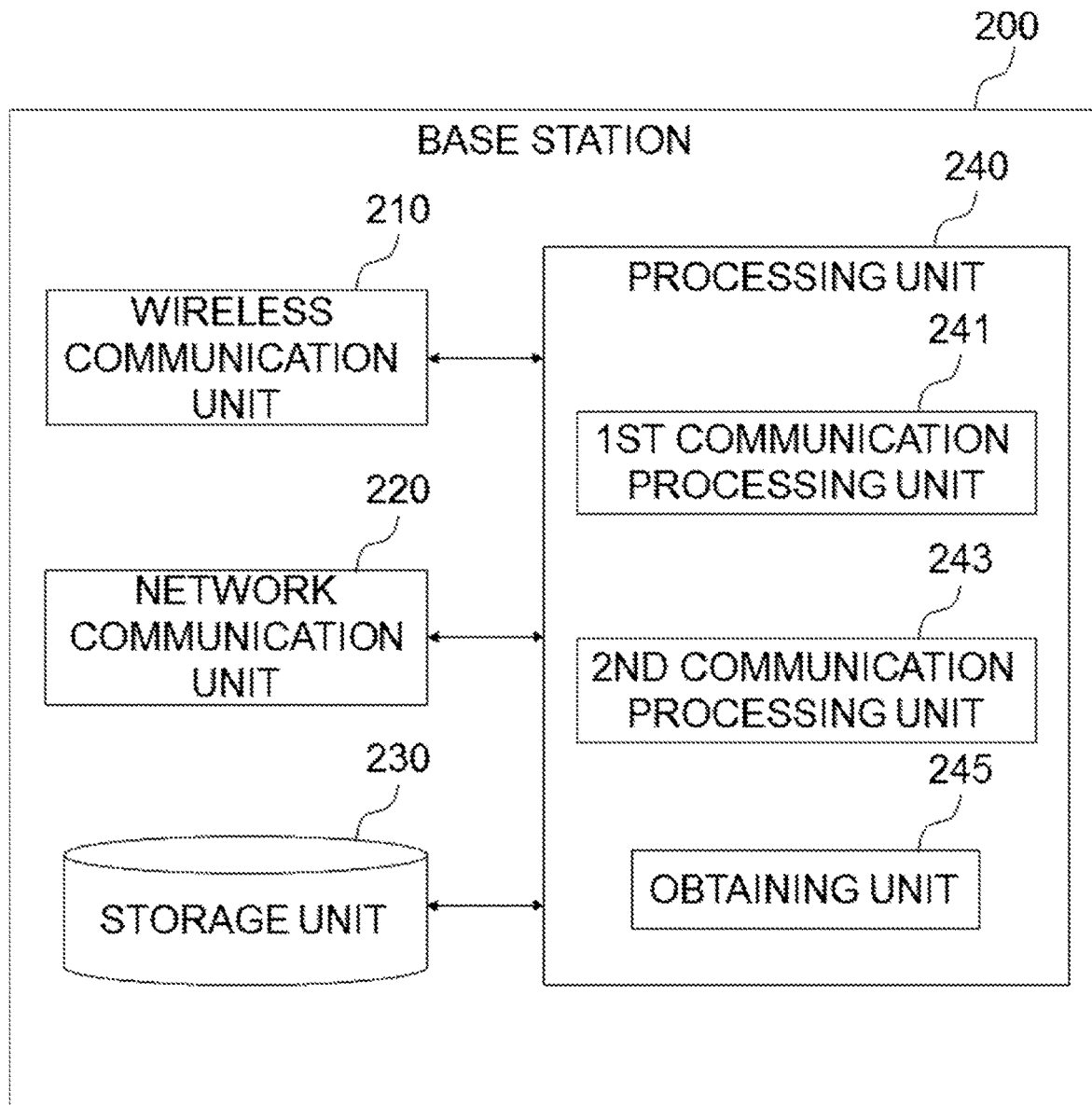
FIG. 4 is a block diagram illustrating an example of a schematic configuration of another base station according to the first example embodiment.

Next, with reference to FIG. 4, a description will be given of an example of a configuration of the base station 200 according to the first example embodiment. FIG. 4 is a block diagram illustrating an example of a schematic configuration of the base station 200 according to the first example embodiment. As illustrated in FIG. 4, the base station 200 includes a wireless communication unit 210, a network communication unit 220, a storage unit 230, and a processing unit 240.

(1) Wireless Communication Unit 210

The wireless communication unit 210 wirelessly transmits and/or receives a signal. For example, the wireless communication unit 210 receives a signal from a terminal apparatus and transmits a signal to the terminal apparatus.

(2) Network Communication Unit 220

The Network Communication Unit 220 Receives a Signal from a Backhaul and Transmits a signal to the backhaul.

(3) Storage Unit 230

The storage unit 230 temporarily or permanently stores programs and parameters for operations of the base station 200 as well as various data. The programs include one or more instructions for operations of the base station 200.

(4) Processing Unit 240

The processing unit 240 provides various functions of the base station 200. The processing unit 240 includes a first communication processing unit 241, a second communication processing unit 243, and an obtaining unit 245. Note that the processing unit 240 may further include other constituent elements than these constituent elements. In other words, the processing unit 240 may perform other operations than the operations of these constituent elements. Concrete operations of the first communication processing unit 241, the second communication processing unit 243, and the obtaining unit 245 will be described later in detail.

For example, the processing unit 240 (first communication processing unit 241) communicates with a terminal apparatus (e.g., the terminal apparatus 300) via the wireless communication unit 210. The processing unit 240 (first communication processing unit 241) performs communication processing in accordance with LTE/LTE-Advanced and/or System Architecture Evolution (SAE) standards or specifications, for example. Moreover, the processing unit 240 (second communication processing unit 243) communicates with another network node (e.g., the base station 100) via the network communication unit 220.

(5) Implementation Example

The wireless communication unit 210 may be implemented with an antenna, a radio frequency (RF) circuit, and the like, and the antenna may be a directional antenna. The network communication unit 220 may be implemented with a network adapter, a network interface card, or the like. The storage unit 230 may be implemented with a memory (e.g., a nonvolatile memory and/or a volatile memory), a hard disk and/or the like. The processing unit 240 may be implemented with a baseband (BB) processor, a different processor and/or the like. The first communication processing unit 241, the second communication processing unit 243, and the obtaining unit 245 may be implemented with the same processor or may be implemented with separate processors. The memory (storage unit 230) may be included in such a processor (chip).

The base station 200 may include a memory configured to store a program (instructions) and one or more processors that can execute the program (instructions). The one or more processors may execute the program to perform operations of the processing unit 240 (operations of the first communication processing unit 241, the second communication processing unit 243, and the obtaining unit 245). The program may be a program for causing the processor(s) to perform operations of the processing unit 240 (operations of the first communication processing unit 241, the second communication processing unit 243, and the obtaining unit 245).

Note that the base station 200 may be virtualized. In other words, the base station 200 may be implemented as a virtual machine. In this case, the base station 200 (virtual machine) may operate as a physical machine (hardware) including a processor, a memory, and the like and a virtual machine on a hypervisor.

<2.4. Configuration of Terminal Apparatus 300>

Figure 5:
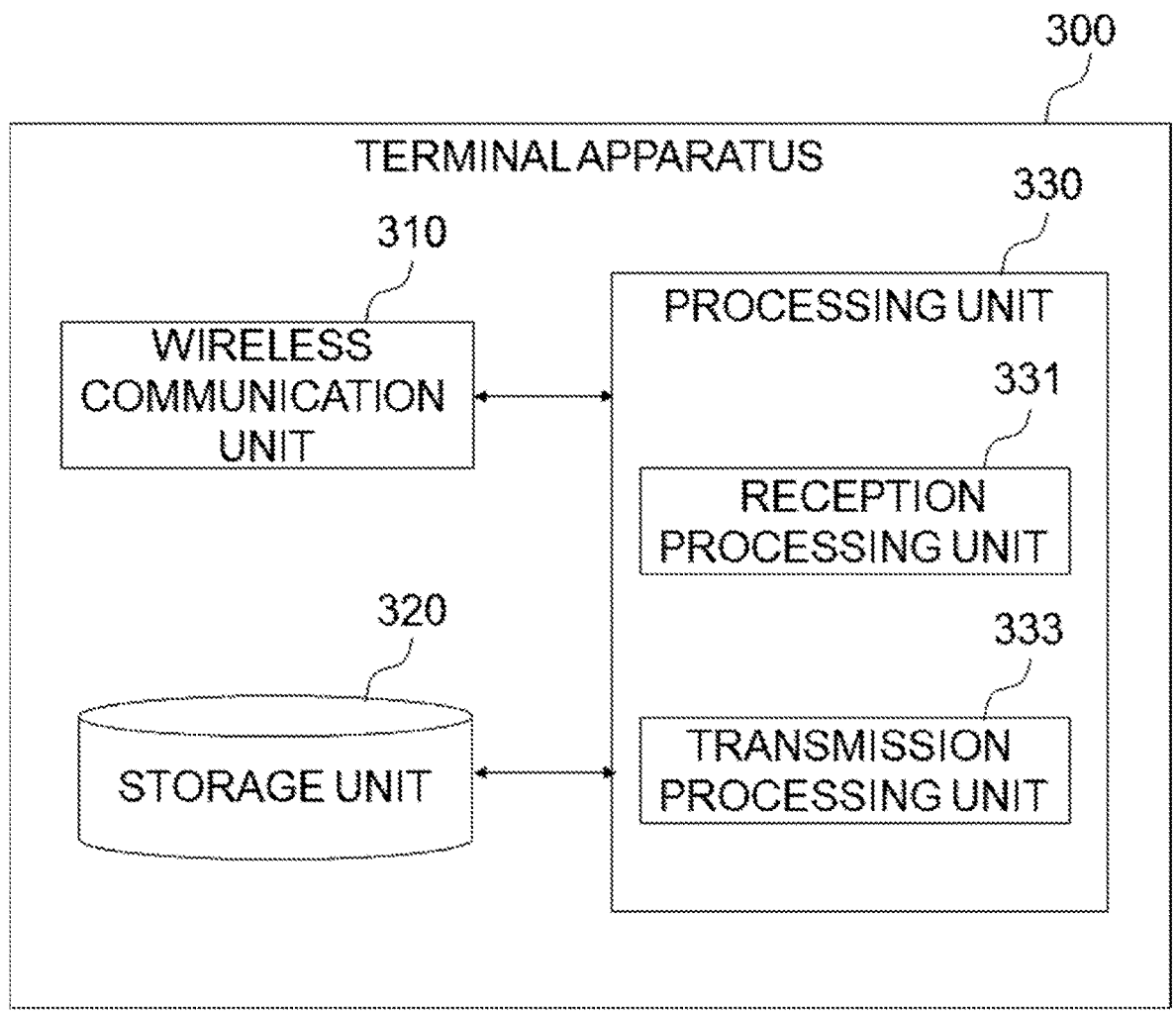
FIG. 5 is a block diagram illustrating an example of a schematic configuration of a terminal apparatus according to the first example embodiment.

Next, with reference to FIG. 5, an example of a configuration of the terminal apparatus 300 according to the first example embodiment will be described. FIG. 5 is a block diagram illustrating an example of a schematic configuration of the terminal apparatus 300 according to the first example embodiment. With reference to FIG. 5, the terminal apparatus 300 includes a wireless communication unit 310, a storage unit 320, and a processing unit 330.

(1) Wireless Communication Unit 310

The wireless communication unit 310 wirelessly transmits and/or receives a signal. For example, the wireless communication unit 310 receives a signal from a base station and transmits a signal to the base station.

(2) Storage Unit 320

The storage unit 320 temporarily or permanently stores programs and parameters for operations of the terminal apparatus 300 as well as various data.

(3) Processing Unit 330

The processing unit 330 provides various functions of the terminal apparatus 300. The processing unit 330 includes a reception processing unit 331 and a transmission processing unit 333. Note that the processing unit 330 may further include other constituent elements than these constituent elements. In other words, the processing unit 330 may perform operations other than the operations of these constituent elements.

For example, the processing unit 330 (the reception processing unit 331 and the transmission processing unit 333) communicates with a base station (e.g., the base station 100, the base station 200, and/or the base stations 10 to 40) via the wireless communication unit 310.

(4) Implementation Example

The wireless communication unit 310 may be implemented with an antenna, a radio frequency (RF) circuit, and the like. The storage unit 320 may be implemented with a memory (e.g., a nonvolatile memory and/or a volatile memory), a hard disk and/or the like. The processing unit 330 may be implemented with a baseband (BB) processor, a different processor and/or the like. The reception processing unit 331 and the transmission processing unit 333 may be implemented with the same processor or may be implemented with separate processors. The memory (storage unit 320) may be included in such a processor (chip) or may be provided external to the one or more processors. As an example, the processing unit 330 may be implemented in a system on chip (SoC).

The terminal apparatus 300 may include a memory configured to store a program (instructions) and one or more processors that can execute the program (instructions). The one or more processors may execute the program to perform operations of the processing unit 330 (operations of the reception processing unit 331 and the transmission processing unit 333). The program may be a program for causing the processor(s) to perform operations of the processing unit 330 (operations of the reception processing unit 331 and the transmission processing unit 333).

<2.5. Technical Features>

Next, technical features of the first example embodiment will be described with reference to FIG. 6 to FIG. 10.

In the first example embodiment, the base station 100 (first communication processing unit 141) communicates with a terminal apparatus (e.g., the terminal apparatus 300) in accordance with the first radio access technology. The base station 100 (obtaining unit 145) obtains handover result information related to results of handovers from the base station 100 to other base stations (e.g., the base stations 10, 20, 30, and 40). The base station 100 (second communication processing unit 143) then transmits, when the terminal apparatus (e.g., the terminal apparatus 300) performs a handover from the base station 100 to the base station 200 that performs wireless communication in accordance with the second radio access technology, the handover result information to the base station 200.

The base station 200 (first communication processing unit 241) wirelessly communicates with the terminal apparatus (e.g., the terminal apparatus 300) in accordance with the second radio access technology. The base station 200 (obtaining unit 245) obtains the handover result information through a backhaul via the network communication unit 220, for example. The base station 200 (second communication processing unit 243) then performs, based on the handover result information, communication processing for the terminal apparatus (e.g., the terminal apparatus 300) performing a handover from the base station 100 to the base station 200.

(1) Handover Result Information

The handover result information is information related to results of handovers from the base station 100 to other base stations (e.g., the base stations 10, 20, 30, and 40) as described above and is held by the base station 100 (storage unit 130) storing the handover result information as history information, for example. In this case, the obtaining unit 145 accesses the storage unit 130 and thereby obtains the handover result information. Note that the handover result information is not limited to the case of being held by the storage unit 130. The handover result information may be held by an external storage apparatus accessible from the base station 100 (obtaining unit 145), for example.

The handover result information may be transmitted from the base station 100 to the base station 200 via a core network node. Specifically, the base station 100 (second communication processing unit 143) may transmit the handover result information to the base station 200 via a core network node (e.g., the NGCN 400, the EPC 450, and the like). In this case, the base station 200 (second communication processing unit 243) receives the handover result information, for example, from the core network node (e.g., the EPC 450) to enable the obtaining unit 245 to obtain the handover result information.

Handover Success Rates

The handover result information specifically includes information indicating handover success rates of respective handover-target base stations (e.g., the base stations 10, 20, 30, and 40). FIG. 6 illustrates a concrete example of handover result information. A description will be given by taking the base station 100 as an example. As illustrated in FIG. 6, the handover result information includes information indicating success rates at the times when a terminal apparatus performed handovers from the cell 100-1 of the base station 100 to other base stations (e.g., the base stations 10, 20, 30, and 40).

Here, the handover success rate represents, for example, the percentage of the number of times a handover has successfully been performed relative to the number of times a handover has been attempted. Determination regarding whether a handover has successfully been performed may be made as follows, for example: when a handover procedure was executed but the handover failed to be completed, the handover may be determined to result in a failure (unsuccessful); and/or when a handover was performed but another handover is needed again within a predetermined time period, the preceding handover may be determined to result in a failure (unsuccessful). Note that whether a handover has successfully been performed or not may be determined based on any predetermined appropriate criterion other than the above, to derive the success rate.

The handover result information is stored in the storage unit (storage unit 130 of the base station 100) as described above. In the base station 100 (e.g., the storage unit 130 of the base station 100), the handover result information may be updated after execution of the handover procedure for the terminal apparatus. The base station 100 may include an update processing unit configured to update the handover result information after execution of the handover procedure for the terminal apparatus.

Note that, as illustrated in FIG. 2, the cell 100-1 is included in the cell 20-1, the cell 30-1, and the cell 40-1 whereas it has a boundary part only slightly overlapping with the cell 10-1. Hence, in this example, as illustrated in FIG. 6, the handover success rate of handovers to each of the cell 20-1 (base station 20), the cell 30-1 (base station 30), and the cell 40-1 (base station 40) is 99% whereas the handover success rate of handovers to the cell 10-1 (base station 10) is 70%.

Note that the handover result information is not limited to the above-described handover success rates and may be history information based on handovers in the past or statistical information based on handovers in the past.

Application Protocol Message

The base station 100 (second communication processing unit 143) may transmit an Application Protocol message including the handover result information to the base station 200. Specifically, the base station 100 (second communication processing unit 143) may set a RAN-INFORMATION RIM container including the handover result information in the Application Protocol message.

For example, FIG. 7 is an explanatory diagram of an SN Addition Container IE set in the RAN-INFORMATION RIM container. For example, the above-described handover result information can be included in Handover History Information illustrated in FIG. 7.

The RAN-INFORMATION RIM container may be set in a Next Generation Application Protocol (NGAP) message corresponding to S1AP: ENB DIRECT INFORMATION TRANSFER in 3GPP TS36.413 v14.4.0 (NPL 2) to be transmitted, for example. FIG. 8 illustrates an example of DIRECT INFORMATION TRANSFER. Alternatively, the RAN-INFORMATION RIM container may be set in a Source to Target Transparent Container in an NGAP: HANDOVER REQUIRED message defined in 3GPP TS38.413 v0.5.0 (NPL 4) to be transmitted, for example.

Communication Processing Based on Handover Result Information

As described above, the base station 200 (second communication processing unit 243) performs, based on the handover result information, communication processing for a terminal apparatus (e.g., the terminal apparatus 300) performing a handover from the base station 100 to the base station 200.

Particularly, in a case where the base station 200 is a Master eNB (MeNB) in dual connectivity, the base station 200 (second communication processing unit 243) may determine, based on the handover result information, a secondary base station with which the terminal apparatus is to communicate in dual connectivity.

In this case, more specifically, the base station 200 (second communication processing unit 243) may refer to the handover result information to determine the secondary base station from among one or more base stations each having a handover success rate that is equal to or larger than a predetermined threshold. For example, in a case where the threshold is 80%, the secondary base station is determined from among the base station 20, the base station 30, and the base station 40 in the example illustrated in FIG. 6 described above.

(2) Flow of Processing

Figure 9:
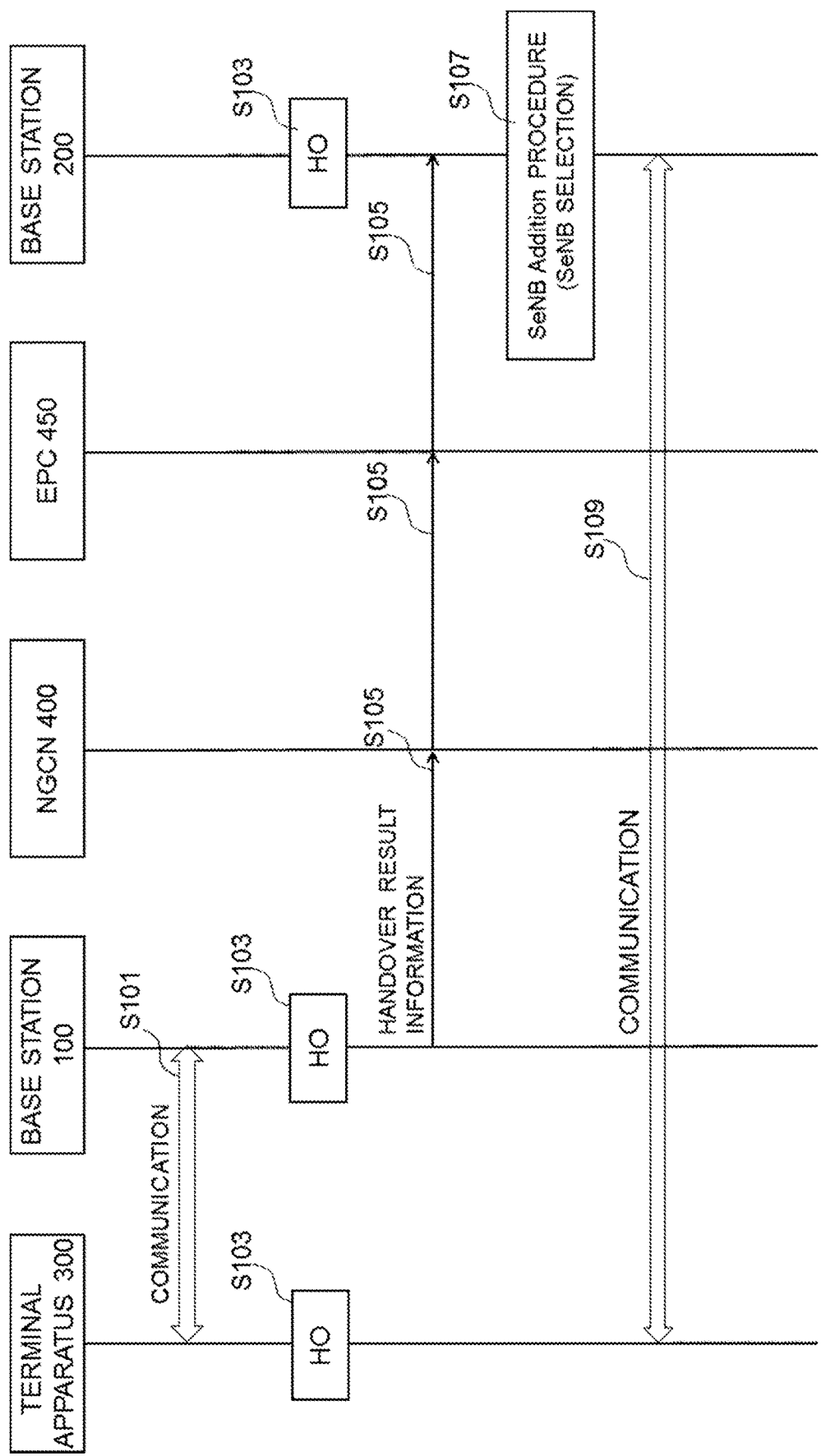
FIG. 9 is a sequence diagram for describing an example of a schematic flow of processing according to the first example embodiment.

With reference to FIG. 9, an example of processing according to the first example embodiment will be described. FIG. 9 is a sequence diagram for describing an example of a schematic flow of processing according to the first example embodiment.

Figure 10:
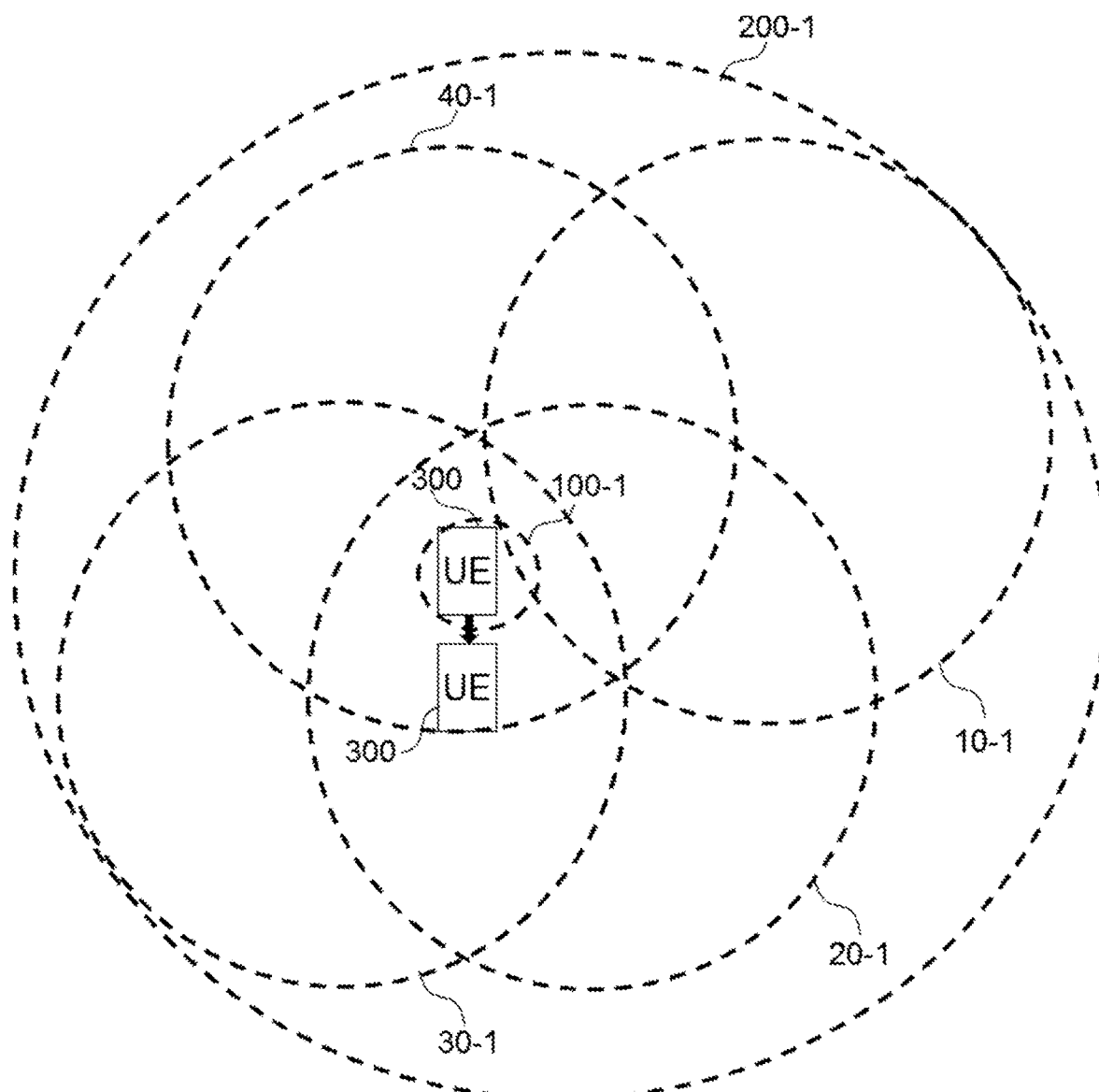
FIG. 10 illustrates an example of a moving path of the terminal apparatus.

Here, a description will be given by assuming that the terminal apparatus 300 is located in the cell 100-1 and transmits and/or receives data to and/or from the base station 100 (S101). In addition, the description will be given by assuming that the handover result information is already stored in the storage unit 130. Here, the terminal apparatus 300 moves. An example of a moving path of the terminal apparatus 300 is illustrated in FIG. 10. When reception power or the like from the cell 200-1 satisfies a predetermined condition as a result of the move of the terminal apparatus 300, an intersystem handover is executed (S103). Consequently, the terminal apparatus 300 is enabled to transmit and/or receive data to and/or from the base station 200.

Here, the base station 100 (obtaining unit 145) obtains the handover result information from the storage unit 130, and the base station 100 (second communication processing unit 143) transmits the handover result information to the base station 200 (S105). For example, the base station 100 (second communication processing unit 143) includes the handover result information in the SN Addition Container IE (see FIG. 7). Moreover, the base station 100 (second communication processing unit 143) sets the SN Addition Container IE in the RAN-INFORMATION RIM container. The base station 100 (second communication processing unit 143) transmits a message including the RAN-INFORMATION RIM container to the NGCN 400.

First Example of Transmitting RAN-INFORMATION RIM Container

As a first example of the transmission, first, the above-described RAN-INFORMATION RIM container is set in the NGAP message corresponding to S1AP: ENB DIRECT INFORMATION TRANSFER as illustrated in FIG. 8. Here, the RAN-INFORMATION RIM container includes the handover result information as described above. Then, a procedure corresponding to "5.15 RAN Information Management (RIM) procedures" in 3GPP TS23.401 v15.1.0 (NPL 3) is executed via the N26 interface. For example, the base station 100 (second communication processing unit 143) transmits the message in which the RAN-INFORMATION RIM container is set, to the NGCN 400, the NGCN 400 transfers the message to the EPC 450 via the N26 interface, and the EPC 450 transfers the message to the base station 200.

Second Example of Transmitting RAN-INFORMATION RIM Container

As a second example of the transmission, the RAN-INFORMATION RIM container is set in a Source to Target Transparent Container in a NGAP: HANDOVER REQUIRED message defined in 3GPP TS38.413 v0.5.0 (NPL 4) to be transmitted. The Source to Target Transparent Container is an information element (IE) for transparent notification of radio related information from a handover-source base station (source base station) to a handover-target base station (target base station), for example. Also in this case, for example, the base station 100 (second communication processing unit 143) transmits the NGAP: HANDOVER REQUIRED message in which the RAN-INFORMATION RIM container is set, to the NGCN 400, the NGCN 400 transfers the NGAP: HANDOVER REQUIRED message to the EPC 450 via the N26 interface, and the EPC 450 transfers the NGAP: HANDOVER REQUIRED message to the base station 200.

For example, the second communication processing unit 243 receives the message including the handover result information, and thus the base station 200 (obtaining unit 245) obtains the handover result information. Upon completion of the intersystem handover, the base station 200 (second communication processing unit 243) determines whether or not to establish dual connectivity. For example, the base station 200 (second communication processing unit 243) determines to establish dual connectivity in consideration of the handover result information (handover success rates) received from the base station 100 in addition to measures such as UE capability of the terminal apparatus 300 and Reference Signal Received Power (RSRP)/Reference Signal Received Quality (RSRQ), and executes the SeNB addition procedure. In the SeNB addition procedure, an SeNB (base station) to be added in dual connectivity is determined based on the handover result information (handover success rates). For example, the success rate of handovers to the cell 10-1 is low according to the handover result information, and hence the base station 10 is excluded from the SeNB addition targets. In consideration of such other measures, a target of the SeNB addition is determined from among the base station (SeNB) 20, the base station (SeNB) 30, and the base station (SeNB) 40 with which the base station 200 has the X2 interface. The terminal apparatus 300 thereafter communicates with the base station (MeNB) 200 and with an added base station (SeNB).

Note that, regarding the handover success rate, the base station 200 (second communication processing unit 243) may determine that the handover success rate is low when the handover success rate is equal to or smaller than a predetermined threshold. Alternatively, the base station 200 (second communication processing unit 243) may determine that the handover success rate is low when the handover success rate is relatively low among the handover success rates of the respective cells (e.g., equal to or smaller than the average).

In the above-described example, an SeNB addition target is determined by excluding the base station having a low handover success rate from SeNB addition targets and considering some other measures. Alternatively, a base station having a high handover success rate may be determined as an SeNB addition target, or a new measure based on the handover success rate and some other measures may be derived to determine an SeNB addition target (i.e., the handover success rate and some other measures may be totally taken into consideration).

According to the present example embodiment, for example, it is possible to prevent events such as dual connectivity release and dual connectivity re-connection from occurring frequently even in a case where the base station (MeNB) 200 establishes dual connectivity after an intersystem handover from 5G to LTE. Thus, deterioration in quality of user experience, an increase in network processing load, and the like can be avoided.

<2.6. Example Alterations>

In the first example embodiment, all the base stations connecting to the EPC 450 are assumed as LTE base stations. However, one or some of the base stations may be 5G base stations. Here, the first example embodiment is applicable at the time when the eNB executes an SgNB Addition procedure for the gNB in a case where E-UTRA-NR Dual Connectivity (EN-DC below) described in 3GPP TS37.340 v2.0.0 (NPL 1) is executable.

In the first example embodiment, a description has been given of an example in which no interface is established between the base station (gNB) 100 and the base station (MeNB) 200. However, in a case where an interface is established between the base station (gNB) 100 and the base station (MeNB) 200, the handover result information (handover success rates) may be transmitted from the base station 100 to the base station 200 via this interface.

Moreover, in the first example embodiment, a description has been given of an example in which the intersystem handover of the terminal apparatus 300 from the base station (gNB) 100 connecting to the NGCN 400 to the base station (MeNB) 200 connecting to the EPC 450 is performed. However, in contrast to this, the first example embodiment is also applicable to a case of an intersystem handover from the base station (MeNB) 200 connecting to the EPC 450 to the base station (gNB) 100 connecting to the NGCN 400.

In the first example embodiment, a description has been given by taking, as an example, the intersystem handover between a 5G base station and a 4G base station. However, without being limited to the above, the first example embodiment is similarly applicable to an intersystem handover between base stations configured to operate in accordance with communication standards of different generations. For example, the first example embodiment is similarly applicable to intersystem handovers between 3G and 4G, 2G and 4G, and 2G and 3G.

In the above-described example, the base station 200 determines a target base station of an SeNB addition procedure (i.e., a base station to be added in dual connectivity), based on the handover result information. However, the base station 200 is not limited to this and may perform any appropriate processing related to dual connectivity, based on the handover result information. The first example embodiment may be applied to any appropriate technology, other than dual connectivity, for adding a base station (cell) to be used for communication with a terminal apparatus for improvement in throughput and/or faster communication and/or an increase in capacity. In other words, communication processing for a terminal apparatus may be performed for, for example, determining (selecting) a base station (cell) to be added for use in communication with the terminal apparatus, based on the handover result information.

3. Second Example Embodiment

Figure 11:
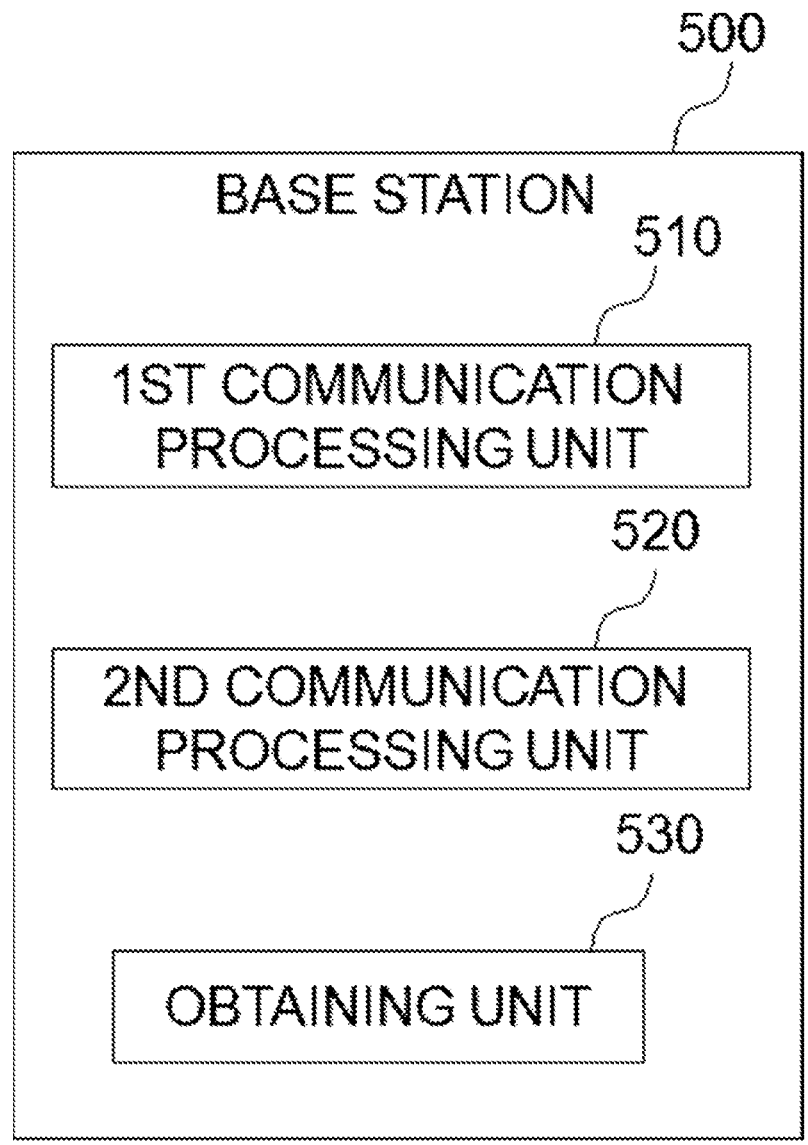
FIG. 11 is a block diagram illustrating an example of a schematic configuration of a base station according to a second example embodiment.
Figure 12:
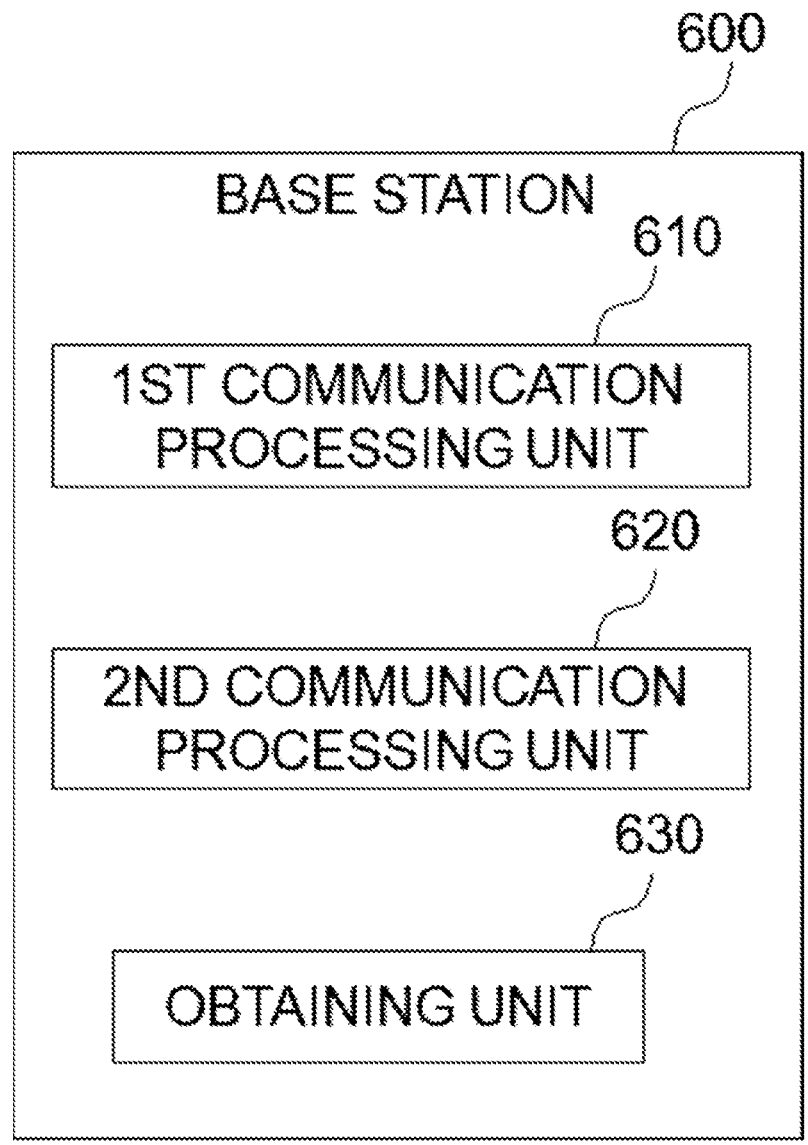
FIG. 12 is a block diagram illustrating an example of a schematic configuration of another base station according to the second example embodiment.
Figure 13:
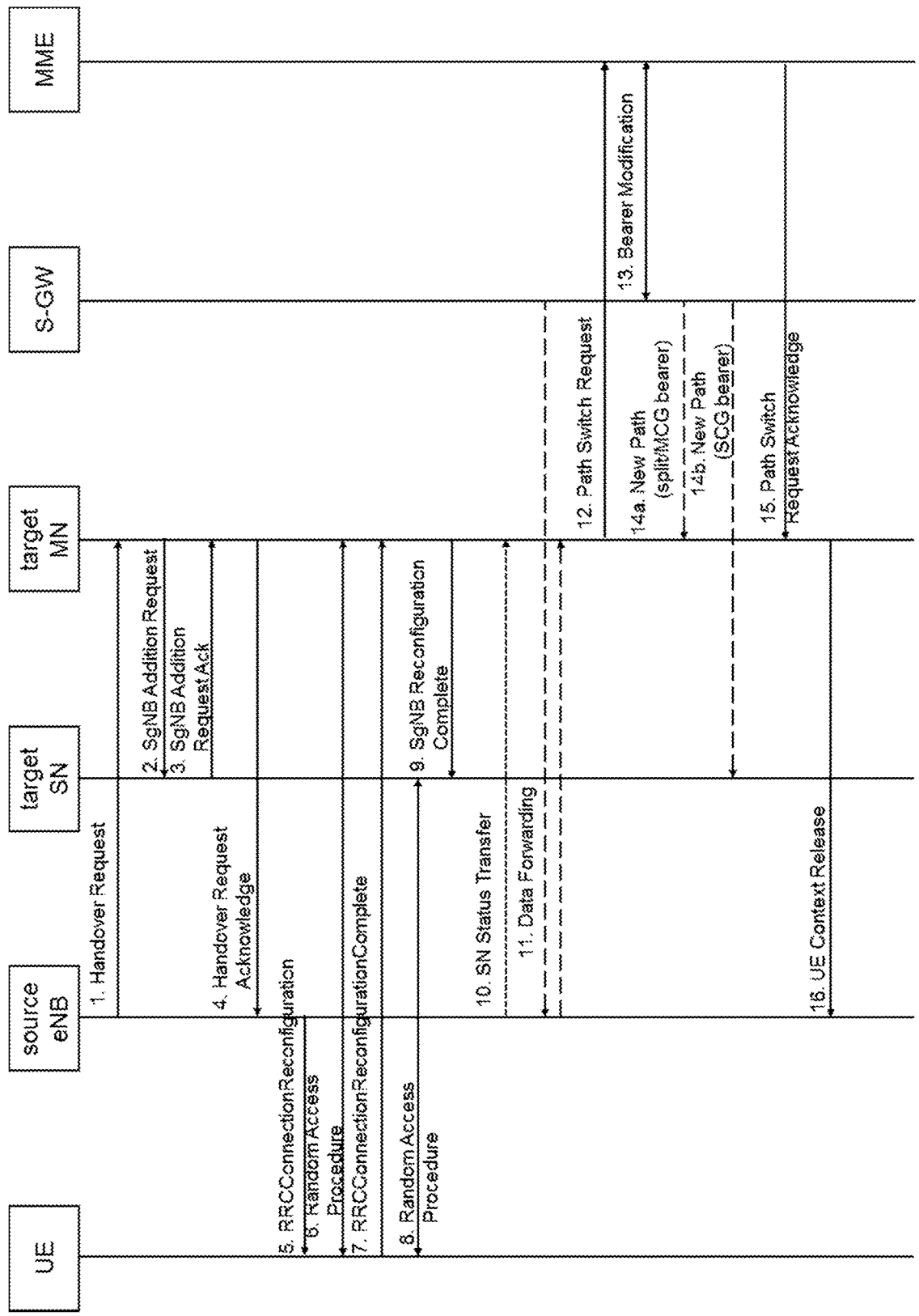
FIG. 13 illustrates a diagram related to "eNB to Master Node change" in NPL 1.
Figure 14:
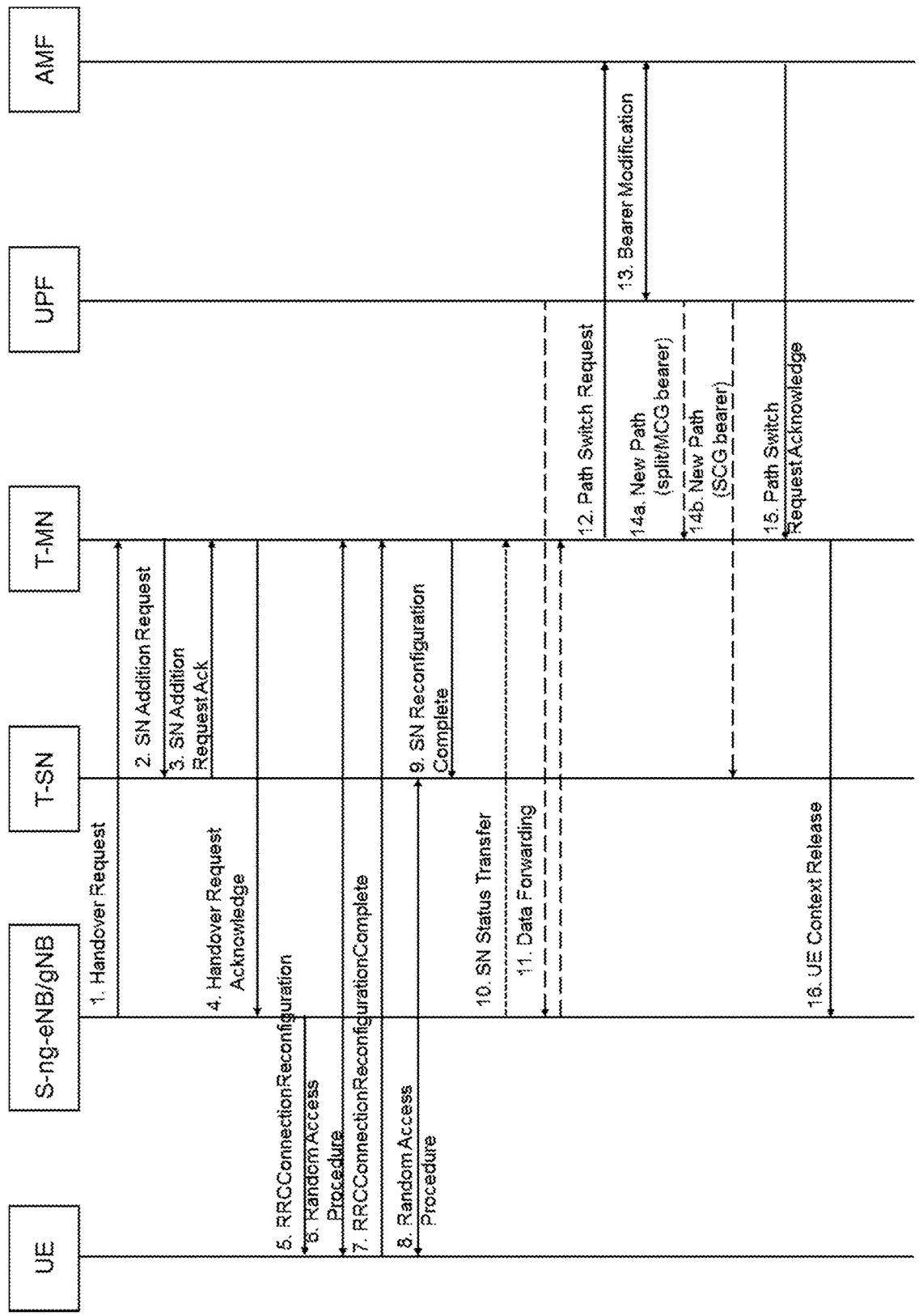
FIG. 14 illustrates a diagram related to "ng-eNB/gNB to MN change" in NPL 1.

Next, a description will be given of a second example embodiment of the present invention with reference to FIG. 11 and FIG. 12. The above-described first example embodiment is a concrete example embodiment, whereas the second example embodiment is a more generalized example embodiment.

<3.1. Configuration of System>

A system according to the second example embodiment includes a base station 500 and a base station 600. The other configurations are similar to those in the first example embodiment and, thus, overlapping descriptions are herein omitted.

<3.2. Configuration of Base Station 500>

Next, with reference to FIG. 11, an example of a configuration of the base station 500 according to the second example embodiment will be described. FIG. 11 is a block diagram illustrating an example of a schematic configuration of the base station 500 according to the second example embodiment. As illustrated in FIG. 11, the base station 500 includes a first communication processing unit 510, a second communication processing unit 520, and an obtaining unit 530.

Concrete operations of the first communication processing unit 510, the second communication processing unit 520, and the obtaining unit 530 will be described later.

The first communication processing unit 510, the second communication processing unit 520, and the obtaining unit 530 may be implemented with a baseband (BB) processor, a different processor and/or the like. The first communication processing unit 510, the second communication processing unit 520, and the obtaining unit 530 may be implemented with the same processor or may be implemented with separate processors.

The base station 500 may include a memory configured to store a program and one or more processors that can execute the program, and the one or more processors may perform operations of the first communication processing unit 510, the second communication processing unit 520, and the obtaining unit 530. The program may be a program for causing the one or more processors to perform the operations of the first communication processing unit 510, the second communication processing unit 520, and the obtaining unit 530.

<3.3. Configuration of Base Station 600>

Next, an example of a configuration of the base station 600 according to the second example embodiment will be described with reference to FIG. 12. FIG. 12 is a block diagram illustrating an example of a schematic configuration of the base station 600 according to the second example embodiment. With reference to FIG. 12, the base station 600 includes a first communication processing unit 610, a second communication processing unit 620, and an obtaining unit 630.

Concrete operations of the first communication processing unit 610, the second communication processing unit 620, and the obtaining unit 630 will be described later.

The first communication processing unit 610, the second communication processing unit 620, and the obtaining unit 630 may be implemented with a baseband (BB) processor, a different processor and/or the like. The first communication processing unit 610, the second communication processing unit 620, and the obtaining unit 630 may be implemented with the same processor or may be implemented with separate processors.

The base station 600 may include a memory configured to store a program and one or more processors that can execute the program, and the one or more processors may perform operations of the first communication processing unit 610, the second communication processing unit 620, and the obtaining unit 630. The program may be a program for causing the one or more processors to perform the operations of the first communication processing unit 610, the second communication processing unit 620, and the obtaining unit 630.

<3.4. Technical Features>

Next, technical features of the second example embodiment will be described.

In the second example embodiment, the base station 500 (first communication processing unit 510) communicates with a terminal apparatus in accordance with a first radio access technology. The base station 500 (obtaining unit 530) obtains handover result information related to results of handovers from the base station 500 to other base stations. The base station 500 (second communication processing unit 520) transmits, when a terminal apparatus (e.g., the terminal apparatus 300) performs a handover from the base station 500 to the base station 600 communicating in accordance with a second radio access technology, the handover result information to the base station 600.

Note that the first communication processing unit 510 may operate similarly to the first communication processing unit 141 of the first example embodiment, the second communication processing unit 520 may operate similarly to the second communication processing unit 143 of the first example embodiment, and the obtaining unit 530 may operate similarly to the obtaining unit 145 of the first example embodiment.

The base station 600 (first communication processing unit 610) wirelessly communicates with a terminal apparatus in accordance with the second radio access technology. The base station 600 (obtaining unit 630) obtains the handover result information. The base station 600 (second communication processing unit 620) then performs communication processing for a terminal apparatus performing a handover from the base station 500 to the base station 600, based on the handover result information.

Note that the first communication processing unit 610 may operate similarly to the first communication processing unit 241 of the first example embodiment, the second communication processing unit 620 may operate similarly to the second communication processing unit 243 of the first example embodiment, and the obtaining unit 630 may operate similarly to the obtaining unit 245 of the first example embodiment.

According to the present example embodiment, for example, even in a case where the base station 600 establishes dual connectivity after an intersystem handover between different RATs, it is possible to prevent events such as, for example, dual connectivity release and dual connectivity re-connection from occurring frequently. Thus, deterioration in quality of user experience and an increase in network processing load can be avoided. Note that it is also possible to apply each of the above-described example alterations of the first example embodiment to the second example embodiment.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the principle of the present invention.

For example, the steps in the processing described in the Specification may not be necessarily performed in the order described in the corresponding sequence diagram in time series. For example, the steps in the processing may be performed in an order different from the order described in the sequence diagram or in parallel. In addition, some of the steps in the processing may be deleted, or further steps may be added to the processing.

An apparatus including constituent elements of the base station described in the Specification (e.g., the communication processing unit and/or the obtaining unit) (e.g., one or more apparatuses (or units) among a plurality of apparatuses (or units) constituting the base station or a module for one of the plurality of apparatuses (or units)) may be provided. An apparatus including the constituent elements of the terminal apparatus described in the Specification (e.g., the reception processing unit and/or the transmission processing unit) (e.g., a module for the terminal apparatus) may be provided. Moreover, methods including processing of the constituent elements may be provided, and programs (or program products) for causing a processor to execute processing of the constituent elements may be provided. Moreover, non-transitory computer-readable recording media (non-transitory computer readable media) recording the programs may be provided. It is apparent that such apparatuses, modules, methods, programs, and non-transitory computer-readable recording media are also included in the scope of the present invention.

The whole or a part of the example embodiments disclosed above can be described as, but not limited to, the following supplementary notes.

(Supplementary Note 1)

A first base station comprising:

a first communication processing unit configured to communicate with a terminal apparatus in accordance with a first radio access technology;

an obtaining unit configured to obtain handover result information related to results of handovers from the first base station to other base stations; and a second communication processing unit configured to transmit, when a terminal apparatus performs a handover from the first base station to a second base station communicating in accordance with a second radio access technology, the handover result information to the second base station.

(Supplementary Note 2)

The first base station according to Supplementary Note 1, wherein the handover result information includes information indicating a handover success rate of each of handover-target base stations.

(Supplementary Note 3)

The first base station according to Supplementary Note 1 or 2, wherein the second communication processing unit is configured to transmit an Application Protocol message including the handover result information to the second base station.

(Supplementary Note 4)

The first base station according to Supplementary Note 3, wherein the second communication processing unit is configured to set, in the Application Protocol message, a RAN-INFORMATION RIM container including the handover result information to transmit the Application Protocol message to the second base station.

(Supplementary Note 5)

The first base station according to Supplementary Note 4, wherein the second communication processing unit is configured to include, in the RAN-INFORMATION RIM container, an SN Addition Container IE including the handover result information and set the RAN-INFORMATION RIM container in the Application Protocol message to transmit the Application Protocol message to the second base station.

(Supplementary Note 6)

The first base station according to any one of Supplementary Notes 1 to 5, wherein the second communication processing unit is configured to transmit the handover result information to the second base station via a core network node.

(Supplementary Note 7)

A second base station comprising:

a first communication processing unit configured to communicate with a terminal apparatus in accordance with a second radio access technology;

an obtaining unit configured to obtain handover result information related to results of handovers from a first base station to other base stations, the first base station communicating in accordance with a first radio access technology; and a second communication processing unit configured to perform, based on the handover result information, communication processing for a terminal apparatus performing a handover from the first base station to the second base station.

(Supplementary Note 8)

The second base station according to Supplementary Note 7, wherein the second communication processing unit is configured to determine, based on the handover result information, a secondary base station with which a terminal apparatus performing a handover from the first base station to the second base station is to communicate in dual connectivity.

(Supplementary Note 9)

The second base station according to Supplementary Note 7 or 8, wherein the handover result information includes information indicating a handover success rate of each of handover-target base stations.

(Supplementary Note 10)

The second base station according to Supplementary Note 9, wherein the second communication processing unit is configured to refer to the handover result information to determine, from among one or more base stations of which handover success rates are equal to or larger than a predetermined threshold, a secondary base station with which a terminal apparatus performing a handover from the first base station to the second base station is to communicate in dual connectivity.

(Supplementary Note 11)

The second base station according to Supplementary Note 9 or 10, wherein the second base station is a Master eNB (MeNB) in dual connectivity.

(Supplementary Note 12)

A method comprising:

obtaining handover result information related to results of handovers from a first base station to other base stations, the first base station communicating with a terminal apparatus in accordance with a first radio access technology; and transmitting, when a terminal apparatus performs a handover from the first base station to a second base station communicating in accordance with a second radio access technology, the handover result information to the second base station.

(Supplementary Note 13)

A method comprising:

obtaining handover result information indicating results of handovers from a first base station to other base stations, the first base station communicating with a terminal apparatus in accordance with a first radio access technology; and performing, based on the handover result information, communication processing for a terminal apparatus performing a handover from the first base station to a second base station communicating in accordance with a second radio access technology.

(Supplementary Note 14)

A system comprising:

a first base station configured to communicate with a terminal apparatus in accordance with a first radio access technology; and a second base station configured to communicate with a terminal apparatus in accordance with a second radio access technology, wherein the first base station comprises
an obtaining unit configured to obtain handover result information indicating results of handovers from the first base station to other base stations, and
a communication processing unit configured to transmit, when a terminal apparatus performs a handover from the first base station to the second base station, the handover result information to the second base station, and
the second base station comprises
an obtaining unit configured to obtain the handover result information and
a communication processing unit configured to perform, based on the handover result information, communication processing for the terminal apparatus performing the handover from the first base station to the second base station.

(Supplementary Note 15)
A program causing a processor to execute:
obtaining handover result information related to results of handovers from a first base station to other base stations, the first base station communicating with a terminal apparatus in accordance with a first radio access technology; and
transmitting, when a terminal apparatus performs a handover from the first base station to a second base station communicating in accordance with a second radio access technology, the handover result information to the second base station.

(Supplementary Note 16)
A program causing a processor to execute:
obtaining handover result information indicating results of handovers from a first base station to other base stations, the first base station communicating with a terminal apparatus in accordance with a first radio access technology; and
performing, based on the handover result information, communication processing for a terminal apparatus performing a handover from the first base station to a second base station communicating in accordance with a second radio access technology.

(Supplementary Note 17)
A non-transitory computer-readable recording medium having recorded thereon a program causing a processor to execute:
obtaining handover result information related to results of handovers from a first base station to other base stations, the first base station communicating with a terminal apparatus in accordance with a first radio access technology; and
transmitting, when a terminal apparatus performs a handover from the first base station to a second base station communicating in accordance with a second radio access technology, the handover result information to the second base station.

(Supplementary Note 18)
A non-transitory computer-readable recording medium having recorded thereon a program causing a processor to execute:
obtaining handover result information indicating results of handovers from a first base station to other base stations, the first base station communicating with a terminal apparatus in accordance with a first radio access technology; and
performing, based on the handover result information, communication processing for a terminal apparatus performing a handover from the first base station to a second base station communicating in accordance with a second radio access technology.

This application claims priority based on Japanese Patent Application No. 2018-047690 filed on Mar. 15, 2018, the entire disclosure of which is incorporated herein.

The present invention can, for example, appropriately select a secondary base station in a case of establishing dual connectivity after a handover.

What is claimed is:
1. A first base station comprising:
a memory storing instructions; and
one or more processors configured to execute the instructions to:
communicate with a terminal apparatus in accordance with a first radio access technology;
obtain handover result information related to results of handovers from the first base station to other base stations; and
transmit, when a terminal apparatus performs a handover from the first base station to a second base station communicating in accordance with a second radio access technology, an Application Protocol message including the handover result information to the second base station, wherein
the one or more processors are configured to execute the instructions to set, in the Application Protocol message, a RAN-INFORMATION RIM container including the handover result information to transmit the Application Protocol message to the second base station,
the RAN-INFORMATION RIM container is an information element for transparent notification to the second base station via a first core network node in the first radio access technology and a second core network node in the second radio access technology, and
the handover result information includes information indicating a handover success rate of each of handover-target base stations, the handover success rate being determined based on whether a first handover failed to be completed and whether a second handover is needed again within a predetermined period after the first handover is completed.

2. The first base station according to claim 1, wherein the one or more processors are configured to execute the instructions to include, in the RAN-INFORMATION RIM container, an SN Addition Container IE including the handover result information and set the RAN-INFORMATION RIM container in the Application Protocol message to transmit the Application Protocol message to the second base station, and
the SN Addition Container IE is an information element for addition procedure of secondary base station in dual connectivity with the second base station for the terminal apparatus.

3. A second base station comprising:
a memory storing instructions; and
one or more processors configured to execute the instructions to:
communicate with a terminal apparatus in accordance with a second radio access technology;
receive an Application Protocol message including handover result information related to results of handovers from a first base station to other base stations, the first base station communicating in accordance with a first radio access technology; and
perform, based on the handover result information, communication processing for a terminal apparatus performing a handover from the first base station to the second base station, wherein
a RAN-INFORMATION RIM including the handover result information is set in the Application Protocol message for transmitting the Application Protocol message from the first base station to the second base station, the RAN-INFORMATION RIM is an information element for transparent notification to the second base station via a first core network node in the first radio access technology and a second core network node in the second radio access technology, and the handover result information includes information indicating a handover success rate of each of handover-target base stations, the handover success rate being determined based on whether a first handover failed to be completed and whether a second handover is needed again within a predetermined period after the first handover is completed.

4. The second base station according to claim 3, wherein the one or more processors are configured to execute the instructions to determine, based on the handover result information, a secondary base station with which a terminal apparatus performing a handover from the first base station to the second base station is to communicate in dual connectivity.

5. The second base station according to claim 3, wherein the one or more processors are configured to execute the instructions to refer to the handover result information to determine, from among one or more base stations of which handover success rates are equal to or larger than a predetermined threshold, a secondary base station with which a terminal apparatus performing a handover from the first base station to the second base station is to communicate in dual connectivity.

6. The second base station according to claim 3, wherein the second base station is a Master eNB (MeNB) in dual connectivity.

7. A method comprising:

obtaining handover result information related to results of handovers from a first base station to other base stations, the first base station communicating with a terminal apparatus in accordance with a first radio access technology;

setting, in an Application Protocol message, a RAN-INFORMATION RIM container including the handover result information to transmit the Application Protocol message to a second base station communicating in accordance with a second radio access technology, and transmitting, when a terminal apparatus performs a handover from the first base station to the second base station, the Application protocol message including the handover result information to the second base station, wherein the RAN-INFORMATION RIM container is an information element for transparent notification to the second base station via a first core network node in the first radio access technology and a second core network node in the second radio access technology, and the handover result information includes information indicating a handover success rate of each of handover-target base stations, the handover success rate being determined based on whether a first handover failed to be completed and whether a second handover is needed again within a predetermined period after the first handover is completed.

* * * * *